United States Patent Office 3,272,621
Patented Sept. 13, 1966

3,272,621
EXTRACTION OF METAL VALUES USING DENITRIFYING MICROORGANISMS
James E. Zajic, Oklahoma City, Okla., assignor to Kerr-McGee Oil Industries, Inc., a corporation of Delaware
No Drawing. Filed Feb. 10, 1964, Ser. No. 343,450
19 Claims. (Cl. 75—101)

This invention broadly relates to a hydrometallurgical process for recovering metal values from their source materials. In some of its more specific aspects, the invention is concerned with the extraction of metal values from metal bearing materials by a process employing denitrifying microorganisms.

The invention may be illustrated and described hereinafter with specific reference to the recovery of copper values from copper-bearing materials. However, it is understood that the principles of the invention may be useful in the recovery of values of other metals, such as copper, cobalt, nickel, lead, cadmium and zinc, from their source materials which contain values soluble in dilute aqueous ammonia.

Conventional methods of recovering copper from copper-bearing material such as ore, tailings or waste dumps involve leaching with a lixiviant such as aqueous sulfuric acid or an aqueous ammonia solution as the primary leaching agent. The specific leaching agent which is selected will depend, among other things, upon the manner in which the copper values are held within the ore and the natural sulfide, carbonate and silicate content of the copper-containing material. The copper sulfide-containing ores such as chalcopyrite, bornite, chalcocite and covellite are more amenable to sulfuric acid leaching than are the copper carbonate and copper silicate-containing ores. In instances where the carbonate content of the ore is high, such as with malachite and azurite, or the ore contains copper silicate materials such as chrysocolla, the ore is not entirely satisfactory for mineral acid leaching due to the high consumption of acid and the formation of undesirable byproducts which are difficult to treat. As a result, the copper silicate and carbonate-containing ores are more amenable to a process utilizing an aqueous ammonia solution as the leaching agent.

Iron-oxidizing bacteria have been employed heretofore to aid in the dissolution of desired metal values from their ores with a lixiviant solution containing ferric sulfate and sulfuric acid. For example, in United States Patent 2,829,964 to Zimmerley et al., a process for leaching copper ore is described which utilizes certain strains of bacteria which are said to be effective to oxidize ferrous iron in a regeneration stage to the ferric state for recycle as an oxidant in the leaching stage. The bacteria which are employed are described as being motile, non-spore forming, oxidizing, autotrophic, rod shaped bacteria which oxidize ferrous iron to ferric iron at a rate greater than is due to the atmosphere alone.

The iron oxidizing bacteria described in the Zimmerley et al. patent are effective only in oxidizing ferrous iron to ferric iron, and they further require an acidic environment. Thus, they find specific application in hydrometallurigical leaching processes in which sulfuric acid and ferric iron are used in combination as the lixiviant. These iron oxidizing bacteria are not satisfactory when applied to other leaching processes for copper-bearing materials, and especially carbonate and silicate-containing copper-bearing materials, nor are they effective in leaching processes employing alkaline media such as aqueous ammonia solutions.

It is an object of the present invention to provide an improved hydrometallurgical process for extracting metal values from metal bearing materials which employes denitrifying microorganisms.

It is a further object to provide an improved process for extracting copper values from copper bearing materials in which denitrifying microorganisms are employed.

Still other objects and advantages of the invention will be apparent to those skilled in the art from the following detailed description and the specific examples.

In accordance with the present invention, an improved process for extracting metal values from solid source materials is provided in which denitrifying microorganisms are cultivated in an aqueous nutrient medium containing a water soluble inorganic nitrate as a source of nitrate ion. The denitrifying microorganisms are tolerant to the aqueous nutrient medium and capable of reducing nitrate ion to ammonia, and the solid material containing the metal values to be extracted is intimately contacted with aqueous nutrient medium in which the denitrifying microorganisms have reduced nitrate ion to thereby extract the metal values and produce an aqueous medium containing dissolved metal values.

It has been discovered that an ecological group of microorganisms, which may be referred to herein as denitrifying bacteria, may be utilized in the process of the invention. Both heterotrophic and autotrophic denitrifying bacteria are known and may be used. Examples of heterotrophic denitrifying bacteria include *Bacillus denitrificans, Micrococcus denitrificans,* and *Pseudomonas denitrificans*. Examples of autotrophic denitrifying bacteria include *Hydrogenomonas facilis,* which obtains its energy from the oxidation of hydrogen, and *Thiobacillus denitrificans,* which obtain its energy under anaerobic conditions in the presence of nitrates and carbon dioxide by the oxidation of thiosulfate to sulfate. The denitrifying microorganisms are often active under anaerobic conditions to reduce nitrate ion to ammonia; however, it is also possible to employ facultative anaerobic denitrifying microorganisms which are ordinarily anaerobic but capable of growing under aerobic conditions, microaerophilic denitrifying microorganisms which grow in the presence of small amounts of air, or aerobic heterotrophic denitrifying microorganisms. One or more of the above microorganisms may be used in practicing the invention and pure cultures are not essential as it is only necessary that denitrifying microorganisms be present which are effective in reducing nitrate ion to nitrite ion, and further to ammonia under the conditions employed. The ammonia thus produced is retained in the aqueous nutrient medium and used to solubilize the metal values contained in the metal bearing material to be extracted.

A desired strain of one or more of the above microorganisms may be obtained for use in practicing the invention by artificially growing the microbes over many generations to thereby produce a strain having the desired tolerance for the specific material to be extracted such as copper ore. This may be accomplished by growing a culture of the microbes in a culture medium containing increasing concentrations of the material to which the microorganisms are to be adapted. Adaptation of the microorganisms may be conveniently accomplished in the laboratory to there obtain a desired culture which is then used in practicing the invention on an increasingly larger scale. The adaptation may consist of growing the denitrifying microorganisms in a standard denitrifying medium which is enriched with small amounts of the metal bearing material which is to be extracted. As the denitrifying microorganisms adapt to the minerals and organic materials present, additional ore is added to thereby increase the concentrations of minerals and organic materials. These steps are repeated over a long period of time with the microbes being subjected to gradually increasing concentrations of the minerals and organic materials until they have the ability to grow rapidly in a nutrient medium which is saturated with the soluble constituents of the ore or other material to be leached.

The aqueous nutrient medium in which the denitrifying microorganisms are cultivated may contain the usual prior art substances employed for cultivating a given microorganism and the selection of a suitable aqueous nutrient media for a given microorganism is within the skill of the art. A wide variety of carbohydrate or hydrocarbon substrates may be used for growth of heterotrophic denitrifying bacteria.

The aqueous nutrient medium is preferably maintained at a temperature of about 1–50° C., and for best results at about 20–35° C., as the denitrifying microorganisms usually multiply most rapidly within this temperature range. Best results are often obtained at a temperature of about 25–30° C. The above temperatures are by way of example only as the microorganisms may also be grown over successive generations to produce a strain tolerant to gradually changing temperatures which may be higher or lower than those mentioned.

The pH of the aqueous nutrient medium is preferably between about 6 and 9.5, and for best results about 8, as the denitrifying microorganisms usually grow more rapidly and are more effective to reduce the nitrate ion to nitrite and then to ammonia within this pH range. Nevertheless, media having higher or lower pH values may be used in some instances, and especially when the denitrifying microorganisms are grown over successive generations and subjected to gradually changing pH and thereby adapted to tolerate higher or lower pH ranges. The aqueous nutrient medium to be used in practicing the present invention contains an effective amount such as, for example, 0.01–20% or more by weight of a water soluble inorganic metal nitrate dissolved therein as a source of nitrate ion for the denitrifying microorganisms. The nature of the inorganic nitrate is not of importance provided the metal is not unduly toxic to the microorganisms, or the microorganisms cannot be grown or adapted to tolerate the metal. Examples of suitable nitrates include sodium nitrate, potassium nitrate, ammonium nitrate, etc., of which usually sodium nitrate is preferred. The inorganic nitrate need not be a chemically pure compound and often it is preferred for economic reasons to employ an impure material such as a naturally occurring nitrate-containing deposit. In some localities such as in certain parts of Peru, copper ore and large deposits of naturally occurring nitrates are found in the same vicinity and the process of the present invention is especially attractive.

The denitrifying microorganisms often are preferably cultivated in the aqueous nutrient medium under anaerobic condition. The process of the present invention may be employed in a number of different variants. For instance, a vessel of suitable size containing the material from which copper values are to be leached, such as copper ore or a quantity of copper bearing waste material, may be flooded with a suitable denitrification medium inoculated with active denitrifying microorganisms which have been adapted for growth on the specific material to be leached. Anaerobic conditions may be achieved by conventional means such as by providing an air tight top for the vessel and replacing the atmosphere therein with carbon dioxide and/or nitrogen. The material to be leached may be present as a fixed bed and the leach liquor recycled, or the material may be agitated with suitable mixing means such as impellers or the like. In most instances, it is preferred that the copper ore be ground prior to leaching such as to 10–400 mesh and preferably to around 100 mesh. When agitation leaching is to be used, the ground ore may be added to the vessel to give a final concentration of from 0.5 to 30% by weight of the resulting mixture of leaching medium and ore. For economic reasons, the aqueous leaching medium should contain the minimal ingredients needed to support the growth of either the heterotrophic or autotrophic denitrifying microorganisms.

In another variant of the invention, low grade copper ores are leached in situ with a nutrient leaching medium containing the denitrifying microorganisms of the present invention. The leaching medium may be introduced through an opening or well drilled into the ore body, and recovered from a second opening or well drilled into the ore body a suitable distance from the injection well. The leaching medium may be treated for recovery of dissolved copper values and returned to the injection well or to an additional injection site. The leaching medium may be maintained under anaerobic conditions throughout the process and nutrients may be added periodically if desired.

In still another variant of the invention, beds of material containing small amounts of copper values such as ore waste dumps from copper mines may be terraced and flooded with a suitable denitrifying medium followed by inoculation with an active denitrifying microorganism which has been adapted for growth on the particular material to be leached. Stagnant anaerobic conditions are easily achieved in such flooded beds of material. After contacting with the denitrifying medium, the flooded surface of the bed may be covered with a high boiling hydrocarbon such as kerosene, or with an alcohol of intermediate molecular weight such as isooctyl alcohol, to encourage development of anaerobic conditions and reduce loss of the leaching medium due to evaporation.

The invention is most useful in the extraction of copper values from copper bearing materials. Specific examples of copper ores which may be leached in accordance with the present invention include oxidic copper ores, carbonate copper ores, siliceous copper ores and pyritic copper ores, and especially copper bearing ores or materials which contain copper values that are solubilized upon leaching with aqueous ammonia. Specific examples of such ores include granite intrusive copper ores, chalcopyrite, altered chalcocite, altered rhyolite and chert breccia.

Further processing of a metal bearing leach liquor obtained in accordance with the present invention may be in accordance with prior art practice. For example, a pregnant leach liquor containing copper values may be passed to a cementation process in which it is contacted with metallic iron and the copper precipitated and recovered in a very finely divided form as cement copper. Preferably, prior to passing the pregnant leach liquor to the recovery process, it is heated to about 100–110° C. to decompose and drive off free ammonia. In such instances, if sufficient sulfur-oxygen compounds are present, the copper may precipitate as copper sulfide, which may be concentrated such as by filtration and the filter cake recovered and dried for subsequent smeltering to produce metallic copper. It is also possible to recover the copper by electrolytic methods following prior art practices. While the above discussion is concerned specifically with the recovery of copper, it is understood that other metals such as cobalt, nickel, lead, cadmium and zinc may be recovered in accordance with the invention.

The foregoing detailed description and the following specific examples are for purposes of illustration only and are not intended as being limiting to the spirit or scope of the appended claims.

EXAMPLE I

This example illustrates the ability of denitrifying microbes to increase the amount of copper leached from a copper ore when compared with a similar leaching process in which the denitrifying microbes are not present.

A uranium ore from the vicinity of Grants, New Mexico containing 0.5% by weight of copper was used in this example. The ore was ground to −100 mesh and 2.0, 4.0 or 16.0 gram portions of the ground ore were added to 100 milliliter aliquots of aqueous denitrifying medium in 600 milliliter filter flasks. The aqueous denitrifying medium contained on a weight basis 0.1% potassium nitrate, 0.1% magnesium sulfate, 0.1% monobasic potassium phosphate, 0.02% calcium chloride, 0.01% ferric chloride, 0.1% asparagine, 0.05% sodium citrate, 0.05% ammonium chloride and 0.05% sodium thiosulfate. After adjustment of pH to 8.0, sterilization and cooling, four flasks containing 0.0, 2.0, 4.0 and 16.0 grams, respectively, of the ground ore were inoculated with 10 milliliters of a six day old crude culture of active denitrifying microbes. Four additional flasks containing like amounts of the ground ore and aqueous denitrifying medium but not containing the denitrifying microbes were used as controls. The atmosphere within the leaching flasks was replaced with a gaseous mixture containing 60% by volume of elemental nitrogen and 40% by volume of carbon dioxide.

The leaching flasks as above prepared were incubated for six days at a temperature of 30° C. while agitated on a rotary shaker at 160 revolutions per minute. At the end of the six-day incubation period, the solids were removed from the leaching medium by centrifugation and the leachate was analyzed for solubilized copper values. Also, both series of leaching flasks were tested to determine if denitrification had occurred. In this determination, the aqueous leachate was tested for nitrite ion which would be formed from the nitrate ion initially present if denitrification had taken place by addition of an acetic acid solution of sulphanilic acid and alphanaphthylamine. The presence of nitrite ion is indicated by the formation of a red to orange-red color. The data thus obtained are recorded below in Table I.

*Table I.—Leaching of copper from uranium ore with denitrifying microorganisms*

| Grams of Ore/ 100 Ml. of Medium | Inoculum (10%) Crude Culture of Denitrifying Microorganism | $NO_2$ Ion Test | Copper (mg./ liter) in Leaching Medium |
|---|---|---|---|
| 0 | + | + | 0.05 |
| 0 | − | − | 0.03 |
| 2.0 | + | + | 33.0 |
| 2.0 | − | − | 21.0 |
| 4.0 | + | + | 51.0 |
| 4.0 | − | − | 33.0 |
| 16.0 | + | + | 111 |
| 16.0 | − | − | 35.0 |

It is apparent from the above data that the flasks which were inoculated with denitrifying microbes contained larger amounts of solubilized copper values in the leaching medium than did the series of control runs. For example, in the two flasks containing 16.0 grams of the copper ore per 100 milliliters of the leaching medium, a yield of 111 mg./liter of solubilized copper values was obtained in the inoculated flask whereas the control flask which contained no denitrifying bacteria had only 35 mg./liter of solubilized copper values. Thus, leaching in the presence of denitrifying microbes resulted in more than a three fold increase in solubilized copper values when compared with the control run in which no denitrifying microbes were present.

EXAMPLE II

This example illustrates the leaching of a variety of copper ores with an aqueous leaching medium containing denitrifying microbes in a first series of runs, and with the same aqueous leaching medium but containing no denitrifying microbes in a second series of runs.

The copper ores used in this example were granite intrusive copper ore containing 0.01% by weight of copper, chalcopyrite containing 0.16% by weight of copper, altered chacocite containing 0.01% by weight of copper, altered rhyolite containing 0.008% by weight of copper, and chert breccia (modified malachite) containing 0.03% by weight of copper. The ores were ground to about −100 mesh in each instance prior to leaching.

In one series of runs either 6 or 12 grams of the ground ore was added to 100 milliliters of the aqueous denitrifying medium used in Example I in a 600 milliliter flask and, after sterilization and cooling, the flask was inoculated with 100 milliliters of an actively growing mixed culture of denitrifying microbes. In another series of runs, flasks containing like amounts of the same ores, aqueous denitrifying medium and denitrifying microbes were used as controls. In each of the two series of runs, the atmosphere in the flasks was replaced with a gaseous mixture containing 60% by volume of elemental nitrogen and 40% by volume of carbon dioxide.

The flasks were incubated at a temperature of 25° C. for six days on a rotary shaker operating at 160 revolutions per minute, and then the solids were removed, the terminal pH was determined, and the aqueous leachate was tested for nitrite ion and analyzed for solubilized copper content as in Example I. The data thus obtained are recorded below in Table II:

*Table II*

| Copper Ore | Percent Ore in Medium | Percent Denitrifying Inoculum | Denitrifying Test for $NO_2$ Ion | Terminal, pH | Copper in Each Medium (mg./liter) |
|---|---|---|---|---|---|
| Granite intrusive (0.01% Copper) | 12 | 10 | + | 8.5 | 0.30 |
|  | 12 |  | − | 8.2 | 0.00 |
| Chalcopyrite (0.16% Copper) | 6 | 10 | + | 8.1 | 0.20 |
|  | 6 |  | − | 7.7 | 0.00 |
| Altered Chalcocite (0.01% Copper) | 12 | 10 | + | 8.4 | 0.50 |
|  | 12 |  | − | 7.8 | 0.10 |
| Altered rhyolite (0.008% Copper) | 12 | 10 | + | 8.2 | 0.60 |
|  | 12 |  | − | 7.9 | 0.10 |
| Chert breccia (Malachite. 0.03% Copper) | 12 | 10 | + | 8.4 | 0.70 |
|  | 12 |  | − | 7.9 | 0.00 |
| Control (No Ore) | 0 | 10 | + | 8.4 | 0.00 |
|  | 0 |  | − | 7.9 | 0.00 |

As may be seen from the data appearing in Table II, very little, if any, copper was extracted from any of the copper ores when using the uninoculated leaching medium. Also, the uninoculated flasks which contained no denitrifying bacteria gave a negative nitrite ion test. The series of flasks inoculated with the denitrifying microbes contained significant amounts of solubilized copper values in the leaching medium and also gave a positive nitrite ion test thereby indiacting that denitrification had taken place. Also, the pH values of the series of inoculated flasks showed the aqueous leachates to be slightly more alkaline than in the uninoculated controls which contained no denitrifying microbes. This is believed to be due to the formation of ammonia or hydroxylamine as a result of the denitrification of the nitrate ion originally present.

What is claimed is:

1. A process for extracting copper values from a solid copper bearing material comprising cultivating denitrifying microorganisms in an aqueous nutrient medium therefor, the denitrifying microorganisms being tolerant to the aqueous nutrient medium and capable of reducing nitrate ion to ammonia, the aqueous nutrient medium containing a water soluble inorganic nitrate dissolved therein as a source of nitrate ion for the denitrifying microorganisms, and intimately contacting the solid copper bearing material with aqueous nutrient medium in which the denitrifying microorganisms have reduced nitrate ion to produce an aqueous medium containing dissolved copper values.

2. The process of claim 1 wherein the denitrifying microorganisms comprise heterotrophic denitrifying microorganisms.

3. The process of claim 1 wherein the denitrifying microorganisms comprise autotrophic denitrifying microorganisms.

4. The process of claim 1 wherein the denitrifying microorganisms are selected from the group consisting of *Bacillus denitrificans, Micrococcus denitrificans, Pseudomonas denitrificans, Hydrogenomonas facilis* and *Thiobacillus denitrificans*.

5. The process of claim 1 wherein the denitrifying microorganisms are cultivated in the aqueous nutrient medium under anaerobic conditions.

6. The process of claim 1 wherein the copper bearing material comprises copper ore selected from the group consisting of oxidic copper ores, carbonate copper ores, siliceous copper ores and pyritic copper ores, the copper bearing material containing copper values which are solubilized upon leaching with aqueous ammonia.

7. The process of claim 1 wherein the denitrifying microorganisms are cultivated in an aqueous nutrient medium therefor having a pH value of about 6–9.5.

8. The process of claim 1 wherein the denitrifying microorganisms are cultivated in an aqueous nutrient medium therefor having a pH value of about 8.

9. The process of claim 1 wherein the denitrifying microorganisms are tolerant to the copper bearing material to be extracted and the denitrifying microorganisms are cultivated in an aqueous nutrient medium which is in intimate contact with the copper bearing material.

10. The process of claim 1 wherein the denitrifying microorganisms are cultivated in an aqueous nutrient medium having a temperature of about 5–50° C.

11. The process of claim 1 wherein the denitrifying microorganisms are cultivated in an aqueous nutrient medium having a temperature of about 20–35° C.

12. The process of claim 1 wherein the denitrifying microorganisms are cultivated in an aqueous nutrient medium therefor having a pH value of about 6–9.5 and the copper bearing material comprises copper ore selected from the group consisting of oxidic copper ores, carbonate copper ores, siliceous copper ores and pyritic copper ores, the copper bearing material containing copper values which are solubilized by leaching with aqueous ammonia.

13. The process of claim 12 wherein the denitrifying microorganisms are cultivated in an aqueous nutrient medium having a temperature of about 5–50° C.

14. The process of claim 13 wherein the denitrifying microorganisms are cultivated in the aqueous nutrient medium under anaerobic conditions.

15. The process of claim 14 wherein the denitrifying microorganisms are tolerant to the copper bearing material to be extracted and the denitrifying microorganisms are cultivated in aqueous nutrient medium which is in intimate contact with the copper bearing material.

16. The process of claim 15 wherein the denitrifying microorganisms are selected from the group consisting of *Bacillus denitrificans, Micrococcus denitrificans, Pseudomonas denitrificans, Hydrogenomonas facilis* and *Thiobacillus denitrificans*.

17. The process of claim 18 wherein the denitrifying microorganisms are cultivated in an aqueous nutrient medium having a temperature of about 20–35° C.

18. The process of claim 17 wherein the denitrifying microorganisms are cultivated in an aqueous nutrient medium therefor having a pH value of about 8.

19. A process for extracting metal values from solid material containing values solubilized by leaching with aqueous ammonia of at least one metal selected from the group consisting of copper, cobalt, nickel, lead, cadmium and zinc comprising cultivating denitrifying microroganisms in an aqueous nutrient medium therefor, the denitrifying microorganisms being tolerant to the aqueous nutrient medium and capable of reducing nitrate ion to ammonia, the aqueous nutrient medium containing a water soluble inorganic nitrate dissolved therein as a source of nitrate ion for the denitrifying microorganisms, and intimately contacting the said solid material containing the metal values to be extracted with aqueous nutrient medium in which the denitrifying microorganisms have reduced nitrate ion to thereby produce an aqueous medium containing the dissolved metal values.

References Cited by the Examiner

UNITED STATES PATENTS 2,829,964    4/1958    Zimmerly et al. _____ 75—104

OTHER REFERENCES

Bryner et al.: "Microorganisms in Leaching Sulfide Minerals," Industrial and Engineering Chemistry, vol. 49, No. 10, October 1957, pages 1721–1724.

Sutton et al.: "Leaching Copper Sulfide Minerals With Selected Autotrophic Bacteria," Bureau of Mines Report of Investigations, No. 6423 (1964).

DAVID L. RECK, *Primary Examiner.*

N. F. MARKVA, *Assistant Examiner.*